(12) United States Patent
Sandiford

(10) Patent No.: US 11,881,199 B2
(45) Date of Patent: *Jan. 23, 2024

(54) MULTI-FREQUENCY HELMHOLTZ RESONATOR SYSTEM

(71) Applicant: ITT MANUFACTURING ENTERPRISES LLC, Wilmington, DE (US)

(72) Inventor: A. David Sandiford, Lake Hughes, CA (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,483

(22) Filed: Dec. 22, 2022

(65) Prior Publication Data

US 2023/0215412 A1 Jul. 6, 2023

Related U.S. Application Data

(63) Continuation of application No. 16/372,007, filed on Apr. 1, 2019, now Pat. No. 11,562,727.

(60) Provisional application No. 62/651,540, filed on Apr. 2, 2018.

(51) Int. Cl.
*G10K 11/172* (2006.01)
*B64D 33/02* (2006.01)

(52) U.S. Cl.
CPC ............ *G10K 11/172* (2013.01); *B64D 33/02* (2013.01); *B64D 2033/0206* (2013.01)

(58) Field of Classification Search
CPC ............ B64D 2033/0206; B64D 33/02; G10K 11/172
See application file for complete search history.

(56) References Cited

U.S. PATENT DOCUMENTS

| | | | |
|---|---|---|---|
| 3,819,009 A * | 6/1974 | Motsinger | F02C 7/045 428/116 |
| 5,721,402 A | 2/1998 | Parente | |
| 9,472,179 B1 * | 10/2016 | Cai | G10K 11/172 |
| 11,562,727 B2 * | 1/2023 | Sandiford | G10K 11/172 |
| 2006/0169533 A1 * | 8/2006 | Patrick | F02K 1/44 181/210 |
| 2009/0025393 A1 | 1/2009 | Sheldon et al. | |

(Continued)

FOREIGN PATENT DOCUMENTS

| | | |
|---|---|---|
| EP | 2996110 | 3/2016 |
| EP | 3187713 | 7/2017 |

(Continued)

OTHER PUBLICATIONS

International Search Report and Written Opinion in corresponding International Patent Application No. PCT/US2019/025229, dated Jun. 19, 2019, in 15 pages.

*Primary Examiner* — Forrest M Phillips
(74) *Attorney, Agent, or Firm* — Knobbe, Martens, Olson & Bear, LLP

(57) ABSTRACT

A Helmholtz resonator having a plurality of resonator chamber modules formed into an array. The array is configured to dampen sound. A module of the plurality of resonator chamber modules includes a first chamber and a second chamber. The first and second chambers have different lengths and are tuned to dampen different frequencies of sound.

20 Claims, 7 Drawing Sheets

(56) References Cited

U.S. PATENT DOCUMENTS

| | | | | |
|---|---|---|---|---|
| 2015/0037135 A1* | 2/2015 | Kempton | ................ | F02K 1/827 |
| | | | | 415/119 |
| 2016/0076453 A1* | 3/2016 | Richter | .................... | F02C 7/24 |
| | | | | 181/292 |
| 2017/0174356 A1* | 6/2017 | Lucas | .................... | B64D 41/00 |
| 2018/0218723 A1 | 8/2018 | Lin | | |
| 2019/0304428 A1* | 10/2019 | Sandiford | .............. | B64D 33/02 |

FOREIGN PATENT DOCUMENTS

| | | |
|---|---|---|
| EP | 3232435 | 10/2017 |
| WO | WO2018/034949 | 2/2018 |

\* cited by examiner

MULTI-FREQUENCY HELMHOLTZ RESONATOR SYSTEM

CROSS-REFERENCE

This application is a continuation of U.S. patent application Ser. No. 16/372,007, filed Apr. 1, 2019, which claims the benefit of U.S. Provisional Application No. 62/651,540, filed Apr. 2, 2018, each of which is incorporated by reference herein in its entirety.

BACKGROUND

Field

The present disclosure is generally related to sound attenuation systems. Sound attenuation systems can be used in air inlet ducts of aircraft auxiliary power units and other environments.

Description of Certain Related Art

Many modern aircraft include an auxiliary power unit (APU). The APU is a type of engine, such as a gas turbine engine. The APU is generally used when the aircraft is not in flight, such as waiting at a gate for unloading or loading passengers. The APU can provide power to start the aircraft's main engines and/or to operate various on-board systems, such as lighting, heating and cooling systems, or otherwise.

SUMMARY OF CERTAIN FEATURES

An APU can generate a substantial amount of noise. Some of the noise can pass through an air inlet duct and can be heard by passengers on the aircraft. Sound attenuators can be used to reduce the APU noise. For example, sound dampening material can be positioned within the air inlet duct to the APU. Additional sound attenuation can be achieved by increasing the amount of sound dampening materials. However, increasing the amount of sound dampening material typically increases the volume occupied by such material, which can impact (e.g., reduce) the amount of airflow to the APU and negatively affect APU performance. Accordingly, a need exists to provide a more compact and effective sound attenuator.

Another aspect of the present disclosure is a multi-frequency sound attenuator. The multi-frequency sound attenuator can be an array that includes a plurality of resonator chambers. The resonator chambers can be interconnected (e.g., honeycombed) with adjacent chambers. The array can include pluralities of resonator chambers having different volumes. The different volumes can be tuned to dampen different frequencies of sound. For example, a first group can be tuned to attenuate a higher frequency sound, a second group can be tuned to attenuate a mid-frequency sounds, and/or a third group can be tuned to attenuate lower frequency sound.

According to another aspect, the array includes one or more resonator chambers that include a bend region. The bend region can enable the resonator chambers to have a larger volume with the same diameter. The bend region can thus enable the chamber to dampen lower sound frequencies. The bend region on the resonator chambers can allow for the array to fit within the air inlet duct more compactly. In some embodiments, the array can include multiple resonator chambers having bend regions and/or straight resonator chambers in a compact configuration.

According to another aspect, the multi-frequency array can be manufactured within an air inlet duct. The array can be manufactured using an additive manufacturing process. The multi-frequency array can be customized to the shape of the air inlet duct. The additive manufacturing process can include 3D printing the array of resonator chambers within the air inlet duct.

According to one aspect of the disclosure, an inlet duct for an APU of an aircraft includes an interior surface of at least one side of the inlet duct with a resonator array. The resonator array has a plurality of resonator chamber modules. The resonator array couples with the interior surface and dampens sound from the APU. A module of the plurality of resonator chamber modules includes a first chamber. The first chamber includes a first end and a second end and a first sidewall and a first interior space. The first chamber has a first length that extends between the first and second ends of the first chamber. A second chamber includes a first end, a second end, a second sidewall and a second interior space. The second chamber has a second length that extends between the first and second ends of the second chamber. The first chamber is tuned to dampen a first frequency of sound and the second chamber is tuned to dampen a second frequency of sound.

In another aspect of the disclosure, the first and second lengths are different.

In another aspect of the disclosure, the first length is equivalent to a multiple of 0.5 of the second length.

In another aspect of the disclosure, the first chamber includes a bend region that is positioned between the first and second ends of the first chamber. First and second legs of the first chamber coupled by the bend region.

In another aspect of the disclosure, the first and second legs of the first resonator chamber are at an angle of approximately 90 degrees.

In another aspect of the disclosure, the second chamber includes a bend region between the first and second legs of the second chamber.

In another aspect of the disclosure, the first and second chambers are nested together.

In another aspect of the disclosure, the first ends of the first and second chambers are substantially flush with each other.

In another aspect of the disclosure, the second ends of the first and second chambers are substantially flush with each other.

In another aspect of the disclosure, each of the modules of the plurality of resonator chamber modules includes first and second chambers has respective first and second length. The first and second lengths are different.

In another aspect of the disclosure, the module is a first module and the plurality of resonator chamber modules further includes a second module. The second module includes first and second chambers has respective first and second lengths and first and second sidewall. The first module interconnects with the second module.

In another aspect of the disclosure, the module includes a third chamber has a bend region. The second chamber nested in the bend region of the third chamber.

A Helmholtz resonator array includes a plurality of resonator chambers. Each of the plurality of chambers has an interior space bounded by a sidewall and is connected to at least one other of the plurality of chambers. The plurality of resonator chambers includes a first type of chamber and a second type of chamber. The first type of chamber includes a first volume tuned to dampen a first frequency of sound and the second type of chamber includes a second volume tuned to dampen a second frequency of sound. The first and second volumes are different.

In another aspect of the disclosure, the first type of chamber has a first length and the second type of chamber has a second length. The first and second lengths are different.

In another aspect of the disclosure, the first type of chamber has a first diameter and the second type of chamber has a second diameter. The first and second diameters are different.

In another aspect of the disclosure, the first type of chamber each includes a bend region and first and second legs on either side of the bend region.

In another aspect of the disclosure, the second type of chamber is nested in a respective bend regions of the first type of chambers.

In another aspect of the disclosure, the first type of chamber has a first cross-sectional shape and the second type of chamber has a second cross-sectional shape.

In another aspect of the disclosure, the first cross-sectional shape is different than the second cross-sectional shape.

In another aspect of the disclosure, a method of manufacturing a sound dampening APU inlet duct is to insert a material dispensing head into an inlet duct. Locate the material dispensing head adjacent an interior wall of the inlet duct. Add material with the material dispensing head onto the interior wall of the inlet duct. Form the added material through additive manufacturing into an integrated multi-frequency array of interconnected resonator chambers on the interior wall of the inlet duct. The integrated multi-frequency array of interconnected resonator chambers includes a plurality of first resonator chambers with a first volume and a plurality of second resonator chambers with a second volume. The first and second resonator chambers are tuned to dampen different frequencies of sound.

In another aspect of the disclosure, a inlet duct is positioned in an aircraft to retrofit the aircraft APU inlet duct.

DETAILED DESCRIPTION OF CERTAIN FEATURES

Overview

Figure 1A:
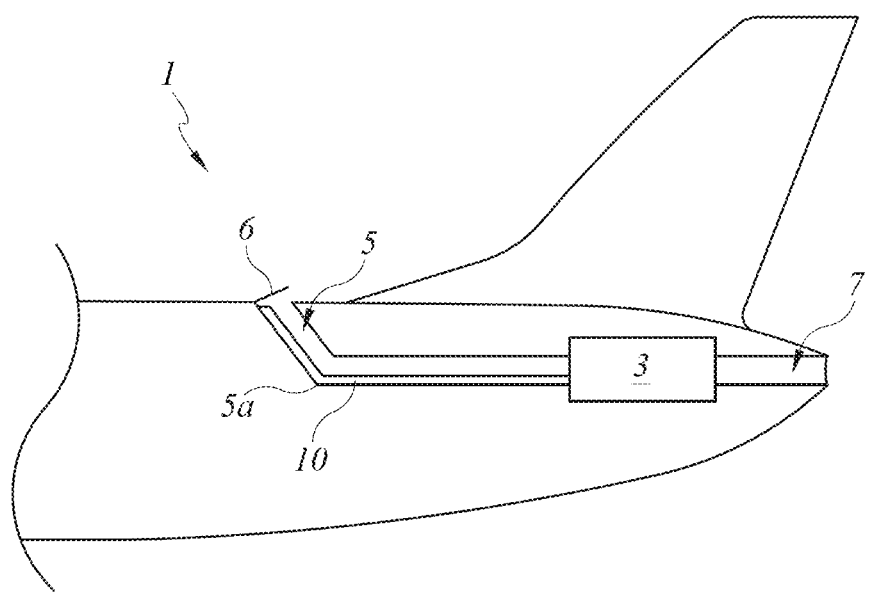
FIG. 1A shows a schematic diagram of a multi-frequency sound attenuator array installed within an inlet duct of an APU.

FIG. 1 schematically illustrates a section of a fuselage 1 comprising an APU 3. The APU 3 can be connected with an air inlet duct 5. The air inlet duct 5 can include a cover 6. The air inlet duct 5 allows air to reach the APU 3. The APU 3 can be connected with an exhaust 7. The exhaust 7 can be located at a rear of the fuselage 1. The air inlet duct 5 can be lined at least partially or fully with a multi-frequency array 10. The multi-frequency array 10 can comprise a plurality of resonator chambers. A plurality of first resonator chambers can be tuned to dampen sound emitted from the APU 3 at a first frequency. A plurality of second resonator chambers can be tuned to dampen sound emitted from the APU 3 at a second frequency.

The array 10 can be manufactured to match the contours of one or more interior surfaces of the inlet duct 5. For example, the inlet duct 5 can include corners or curves and the array 10 can be manufactured to match those corners or curves. As illustrated in FIG. 1, the array 10 extends continuously around a corner 5a of the air inlet duct 5. In certain implementations, the array 10 can be formed by an additive manufacturing process, as described further below.

The APU 3 can generate a substantial amount of noise. Some of the noise can pass through the air inlet duct 5 and can be heard by people nearby, such as passengers on the aircraft. Sound dampening materials or devices can be positioned within the air inlet duct 5 to dampen the noise from the APU 3. However, increasing the amount of dampening material typically increases the volume occupied by such material. The increased volume restricts airflow to the APU 3 and negatively affects the APU's performance. Accordingly, a need exists for compact sound attenuators.

Sound attenuator devices can include Helmholtz resonators. A Helmholtz resonator is a container with a chamber. The chamber has an opening and a volume of fluid, such as air. The opening can be covered by an acoustically transparent sheet. A Helmholtz resonator can provide a dampening effect of specific frequencies and related frequencies of noise emitted. As noise passes over the opening of the chamber, the air within the chamber resonates with the specific frequencies of the noise and absorbs energy from the passing sound waves. This effectively dampens the noise at those specific frequencies. The resonator can be tuned to dampen specific frequencies of noise by adjusting the length of the resonator chamber and/or the volume of air in the resonator chamber. A resonator can be "tuned" to a particular frequency where the resonator dampens sound waves at that frequency. Typically, higher frequencies are dampened with resonator chambers that are shorter and/or have a smaller volume and lower frequencies are dampened with resonator chambers that are longer and/or have a larger volume.

Figure 1B:
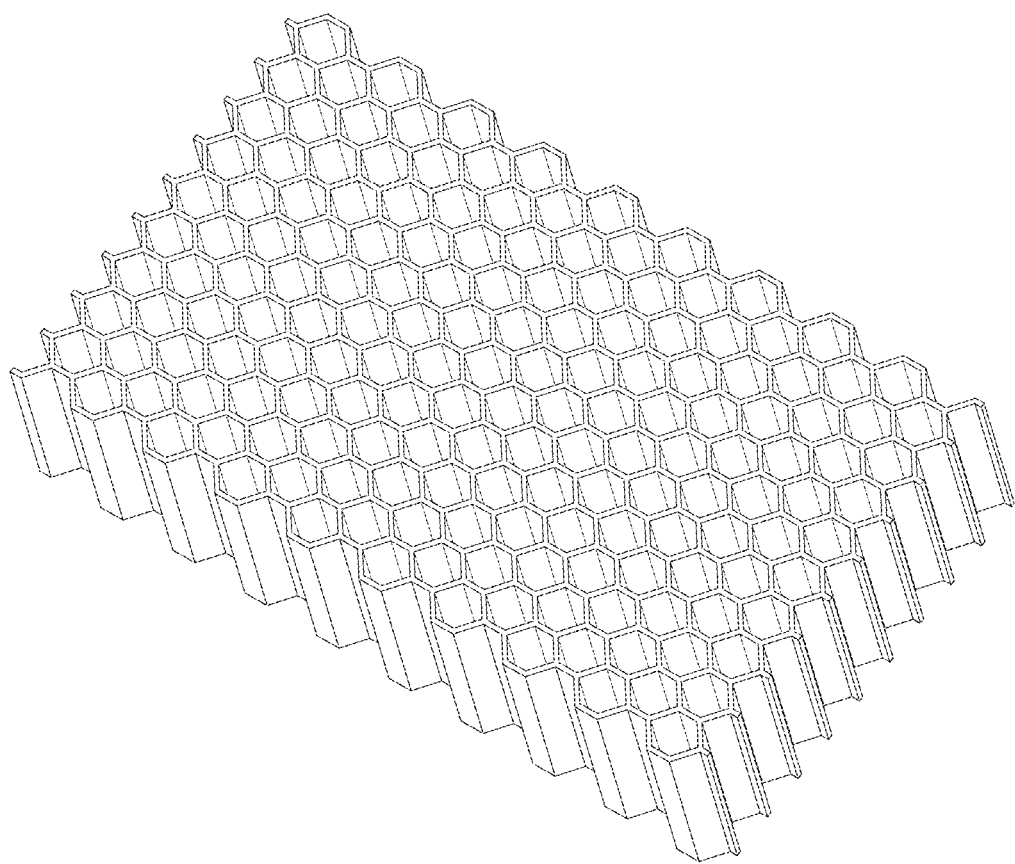
FIG. 1B shows a single-frequency sound attenuator array.

Arrays of Helmholtz resonators can take the form of sheets of honeycombed chambers forming massively in-parallel attenuators, as shown in FIG. 1B. The arrays can have straight tubes of a specific length and diameter and/or hold a specific volume of air within each of the tubes. The chambers of the array can all be the same height, diameter, or volume. A problem with such arrays is that they typically dampen higher frequencies of noise but not lower frequencies. This can be because of spatial constraints. Volume within the air inlet duct 5 is typically limited, and shorter resonator chambers can be easier to fit within the special constraints of the air inlet duct 5 while still providing sufficient airflow to the APU 3. Moreover, shorter resonator chambers are naturally tuned to the higher frequencies of noise and have little to no effect on the lower frequencies.

Another problem with sound attenuating arrays is that they attenuate only a narrow range of frequencies. The arrays can include many interconnected resonator chambers of the same size, such as the same length, diameter, and/or volume. Such arrays fail to dampen sound across a broad range of noise frequencies.

Various arrays are disclosed herein that solve one or more of the aforementioned problems, or other problems. The arrays can include multiple modules. The modules can comprise multiple resonator chambers. The resonator chambers can have various sizes (e.g., lengths) to provide attenuation for multiple frequencies of sound. In several embodiments, the array is configured for use in attenuating the sound produced by an aircraft APU 3; however, the arrays disclosed herein are not solely limited to this context.

Resonator Module

Figure 2:
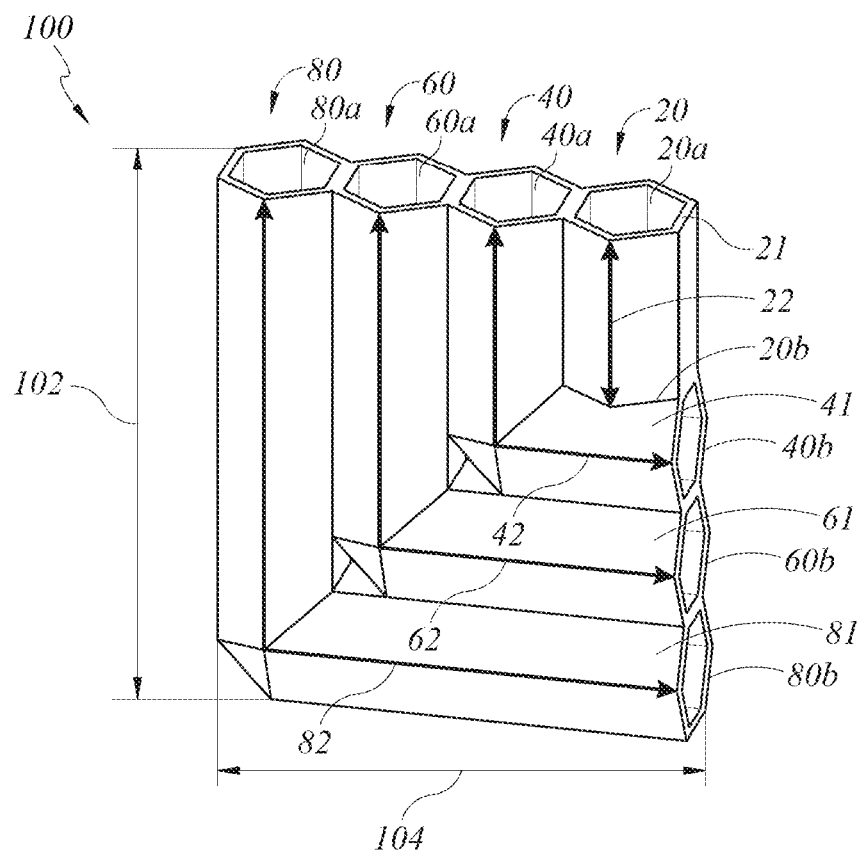
FIG. 2 shows a module of a multi-frequency sound attenuator array.
Figure 3:
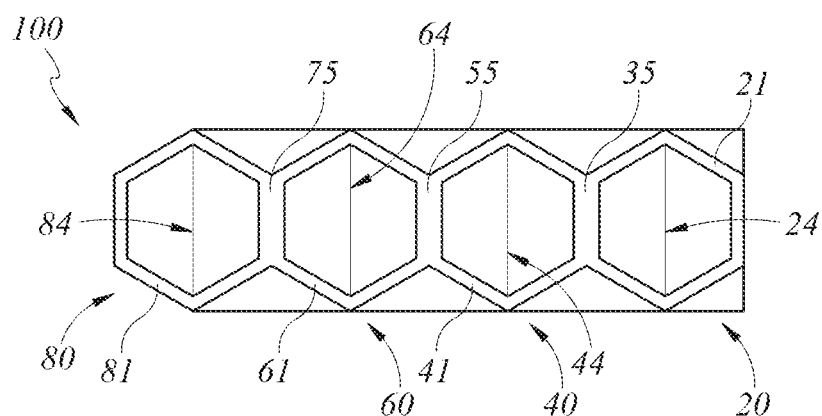
FIG. 3 shows a top view of the module of FIG. 2.
Figure 4:
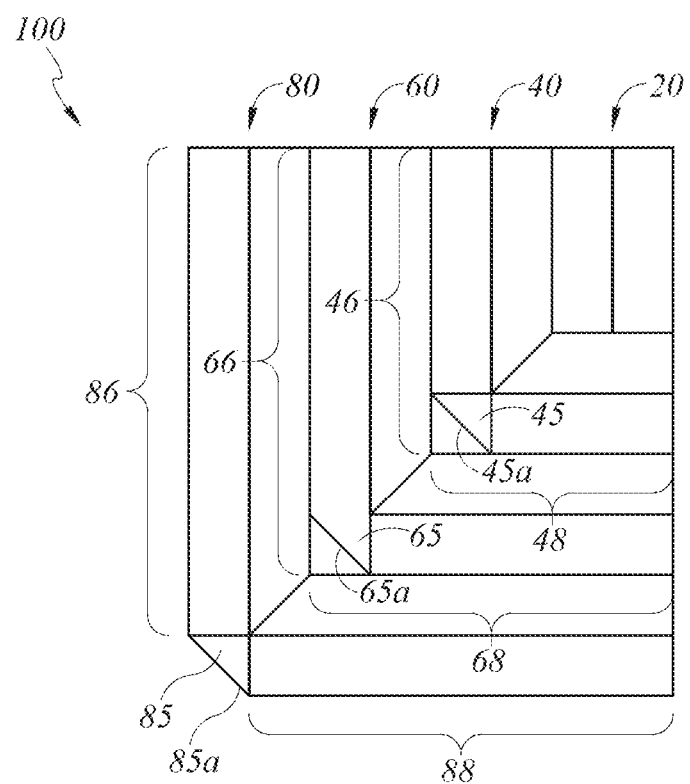
FIG. 4 shows a side view of the module of FIG. 2.

FIGS. 2-4 illustrate an example of a module 100 of a multi-frequency resonator array (not shown). The multi-frequency resonator array can include many modules 100. The array can be organized in rows and columns of the modules 100. The module 100 can represent a single column or row of the array. The multi-frequency resonator array can typically include many resonator chambers, such as about: 50, 100, 200, 300, 500, 1000, 1500, 2000, or more modules.

The module 100 can comprise a plurality of resonator chambers. The resonator chambers can be Helmholtz resonator chambers. In the embodiment illustrated in FIG. 2, the module 100 comprises resonator chambers 20, 40, 60, and 80. The module 100 can include more or fewer resonator chambers than illustrated. Each of the resonator chambers (or groups of resonator chambers) can be tuned to attenuate different frequencies of sound.

Figure 10:
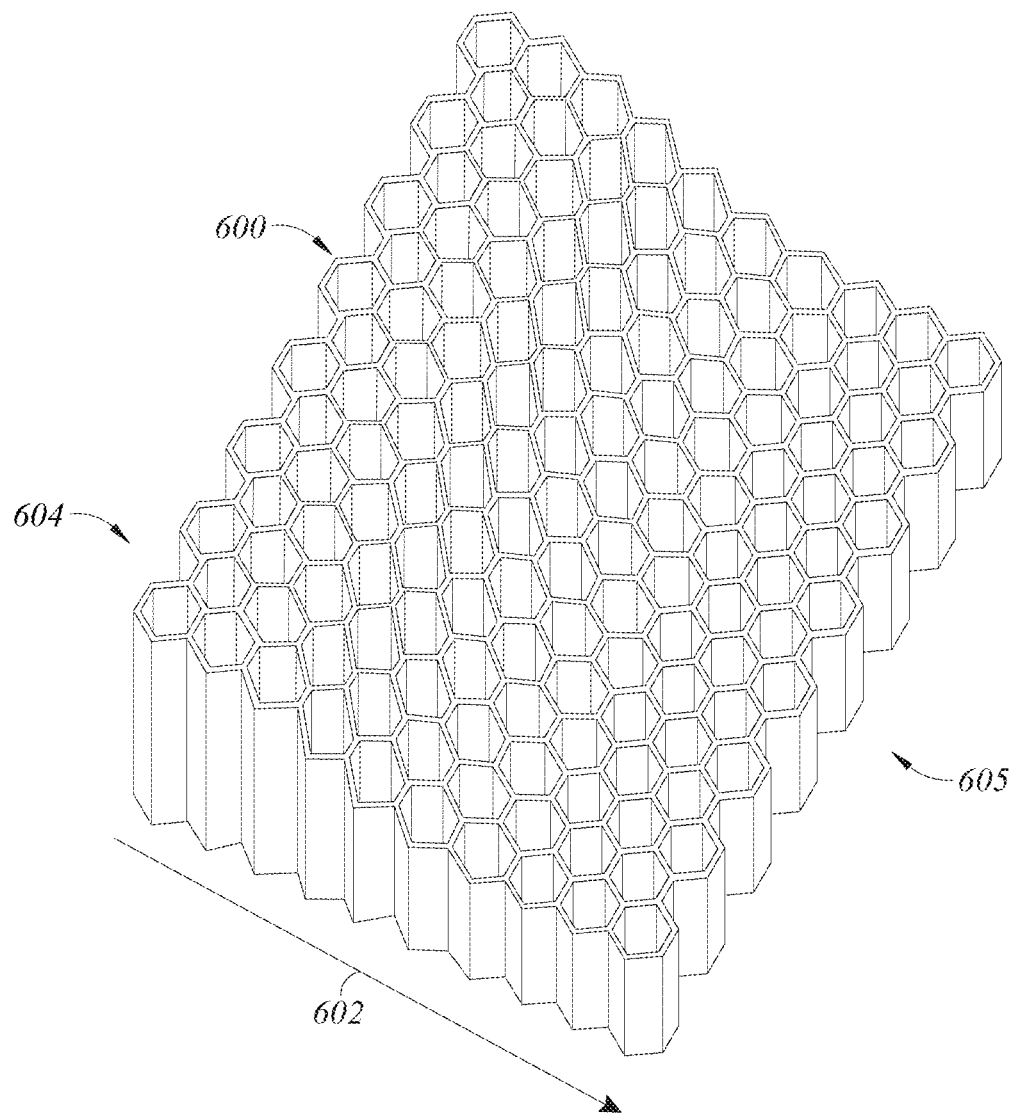
FIG. 10 shows a perspective view of an array of individual resonator chambers of different sizes.

A first resonator chamber 20 can comprise a side wall 21. The side wall 21 can bound an interior volume of the resonator chamber 20. In some embodiments, the resonator chamber 20 can be in the form of an elongate tube having a length 22. As illustrated, the resonator chamber 20 has a generally hexagonal shape in cross-section; however, each of the resonator chambers described herein can have any suitable cross-sectional shape, such as generally: circular, elliptical, rectangular, square, triangular, pentagonal, octangular, etc. FIG. 10 illustrates additional cross-sectional shapes for resonator chambers and modules. The resonator chambers described herein can have substantially uniform cross-sections throughout their length. In some variants, the resonator chambers have a non-uniform cross-section along their length, such as a varying diameter, shape, or otherwise. In some implementations, the resonator chambers taper inward and/or outward along their length. The resonator chamber 20 can include a diameter 24.

A second resonator chamber 40 of the module 100 can comprise a sidewall 41. The second resonator chamber 40 can have a total length 42. The second resonator chamber 40 can comprise a bend region 45. The bend region 45 can divide the second resonator chamber 40 into a first leg 46 and a second leg 48. The total length 42 of the second resonator chamber 40 can equal the total length of both the first and second legs 46, 48. In some embodiments, the first and second legs 46, 48 are equal in length. In other embodiments, the first and second legs 46, 48 are not equal in length. The first leg 46 can be greater than the second leg 48 or vice versa. The resonator chamber 40 can include a diameter 44.

The bend region 45 can comprise various forms. In some embodiments, the bend region 45 can be approximately 90° to form an angle of approximately 90° between the first and second legs 46, 48. In some embodiments, the bend region 45 comprises an angle between the first and second legs 46, 48 of at least about 10° and/or less than or equal to about 170°. In some implementations, the bend region 45 can be 180°. In some implementations, the resonator chamber 40 comprises a plurality of bend regions 45, such as: 2, 3, 4, 5, or more. As illustrated, in some embodiments, one or more of the resonator chambers comprises a generally L-shaped bend region 45. Certain variants have bend regions or bend region 45 to form a general C-shape or other profile.

The resonator chamber 40 can include a corner 45a. The corner 45a can be on the bend region 45. The corner 45a may be flat, chamfered, or curved. The shape of the corner 45a can improve or alter the acoustic response of the resonator chamber 40. The corner 45a of the module 100 can form a gap between the resonator chambers 20, 40 of the module 100. Other gaps can be included between other resonator chambers of the module 100. The gaps can be used as a drain in the case of water intrusion, condensation, leakage, etc.

The module 100 can include additional resonator chambers, such as third and/or fourth resonator chambers 60, 80. The third and fourth resonator chambers 60, 80 can include any of the features of the resonator chamber 40. The third resonator chamber 60 can comprise a sidewall 61 and a total length 62. A bend region 65 can divide the third resonator chamber 60 into first and second legs 66, 68. In some embodiments, the first and second legs 66, 68 are equal in length. In other embodiments, the first and second legs 66, 68 are not equivalent in length. The fourth resonator chamber 80 can comprise a sidewall 81, a total length 82, a bend region 85, first and/or second legs 86, 88. The third and fourth chambers 60, 80 can each include corners 65a, 85a, which can be on respective bend regions 65, 85. The corners 65a, 85a can form gaps between the resonator chambers 40, 60 and/or 80. The resonator chambers 60, 80 can include diameters 64, 84.

In various embodiments, the resonator chambers 20-80 can interconnect. For example, the adjacent resonator chambers of the module 100 can be joined at and/or share a common sidewall. As shown in FIG. 3, the interconnecting regions 35, 55, and/or 75 can connect the sidewalls of adjacent resonator chambers of the module 100. Similarly, interconnecting regions can connect adjacent modules with the module 100. Thus, the sidewalls 21, 41, 61, and/or 81 of the resonator chambers 20-80 of the module 100 can share sidewalls with adjacent resonator chambers.

The resonator chambers 20-80 can be isolated from each other. For example, the air within one resonator chamber is not in fluid communication with the air in another or adjacent resonator chamber. However, in certain variants, the resonator chambers are interconnected from each other such that the air within one resonator chamber is in fluid communication with the air in another resonator chamber. In one example, the sidewall 41 can include an aperture (not shown) aligned with the first resonator chamber 20. This arrangement can provide increased volume for the resonator chambers 20 and/or 40.

The module 100 can be used to attenuate a much wider range of frequencies than an array having a single tube height. Tuning of the resonator chambers of the module 100 to correspond to particular frequencies can be done by changing the total length, diameter and/or the shape of the resonator chambers. Certain embodiments are configured to provide sound attenuation of at least about 10 dB for a range of frequencies between about 800 Hz to about 2 kHz. Some embodiments are configured to provide sound attenuation of at least about 15 dB for a range of frequencies between about 800 Hz to about 2 kHz. Certain variants are configured to provide sound attenuation of at least about 20 dB, or at least about 25 dB, for a range of frequencies between about 2 kHz to about 2.5 kHz. In some implementations, in a range of frequencies between about 800 Hz to about 8 kHz, the module 100 provides sound attenuation of at least about 15 dB and/or less than or equal to about 35 dB. In contrast, certain other sound attenuators provide less than 5 dB of sound attenuation at 800 Hz and/or less than 15 dB of sound attenuation at 2 kHz.

The module 100 can have a height 102 and/or a length 104. The height 102 can approximately equal the length 104. The lengths of one or more of the resonator chambers 20, 40, 60, 80 can be related to the height 102 and/or length 104 of the module 100. For example, the length 22 of the chamber 20 can be 0.5× the height 102 and/or length 104, the total length 42 of the chamber 40 can be 1.0× the height 102 and/or length 104, the total length 62 can be 1.5× the height 102 and/or length 104, and/or the total length 82 can be 2.0× the height 102 and/or length 104. In some embodiments, the height 102 of the module 100 is greater than or equal to the length 104 of the module 100. For example, the module 100 can have a generally square shape.

In some examples, the lengths 22, 42, 62, and/or 82 of the resonator chambers 20-80 can be mathematically related. The length 22 can be 0.25×, the length 42 can be 0.5×, the length 62 can be 0.75× and/or the length 82 can be 1.0×. X can be an attenuated wavelength.

Each or any of the resonator chambers 20-80 can include a leading edge 20a, 40a, 60a, and/or 80a. Each or any of the resonator chambers 20-80 can include a trailing edge 20b, 40b, 60b, and/or 80b. The leading edges 20a-80a can be open to an interior space of the resonator chambers bounded by the corresponding sidewalls 21-81. In some implementations, any or all of the leading edges 20a-80a are covered with an acoustically transparent material. In certain embodiments, any or all of the trailing edges 20a-80a are closed or covered with an acoustically transparent material. For example, the trailing edges 20b-80b can include an endwall and/or can abut against the sidewall of an adjacent resonator chamber.

According to some variants, the leading edges 20a-80a and/or trailing edges 20b-80b of the resonator chambers of the module 100 can be aligned (e.g., substantially flush) with adjacent leading of trailing edges 20b-80b. This arrangement can provide a smooth flow of air passing into the inlet duct 5. For example, in some embodiments, each resonator chamber of the module 100 can fit together with adjacent modules of the array having resonator chamber modules.

In some embodiments, the leading edges 20a-80a and/or trailing edges 20b-80b of the resonator chambers 20-80 can be staggered (e.g., offset with adjacent leading or trailing edges of adjacent resonator chambers). For example, the leading or trailing edges can form a sawtooth configuration. This can facilitate certain acoustic absorption characteristics at the expense of boundary layer flow turbulence.

The resonator chambers 20-80 can be nested with one or more adjacent resonator chambers. For example, the resonator chamber 20 can be nested within the bend region 45 of the resonator chamber 40. The length 22 of the resonator chamber 20 can fit within (e.g., be less than or equal to) the length of the first leg 46 of the resonator chamber 40. The width (e.g., a diameter) of the resonator chamber 20 can fit within the length of the second leg 48 of the resonator chamber 40. In various embodiments, the resonator chamber 20 can be received in the bend region 45 and/or bounded by the first and/or second legs 46, 48. The resonator chamber 40 can be nested within the resonator chamber 60. For example, the first leg 46 of the resonator chamber 40 can fit within the first leg 66 of the resonator chamber 60. The second leg 48 of the resonator chamber 40 can fit within the second leg 68 of the resonator chamber 60. The resonator chamber 60 can likewise be nested within the bend region 85 of the resonator chamber 80.

The nesting of the resonator chambers 20-80 and/or the bend regions 45-85 can provide a compact arrangement for the module 100. Moreover, the resonator chambers 20-80 of the module 100 can facilitate multi-frequency sound attenuation.

Resonator Array

Figure 5:
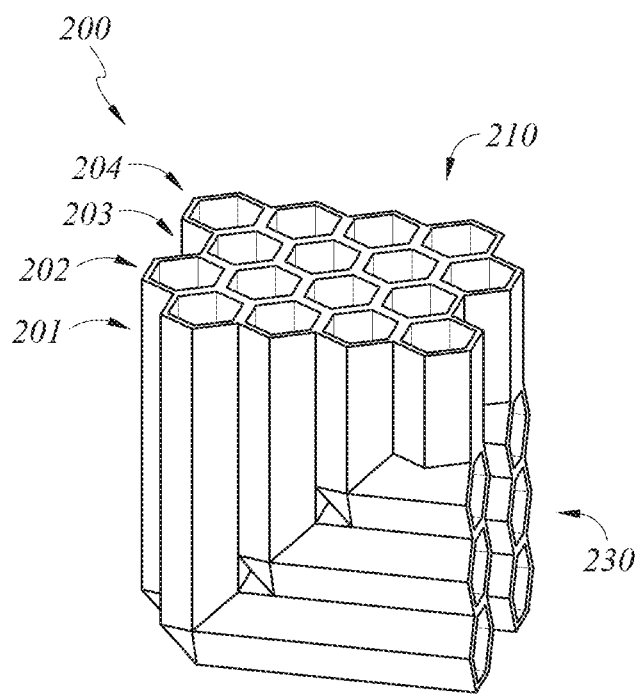
FIG. 5 shows multiple modules of a multi-frequency sound attenuator array.
Figure 6:
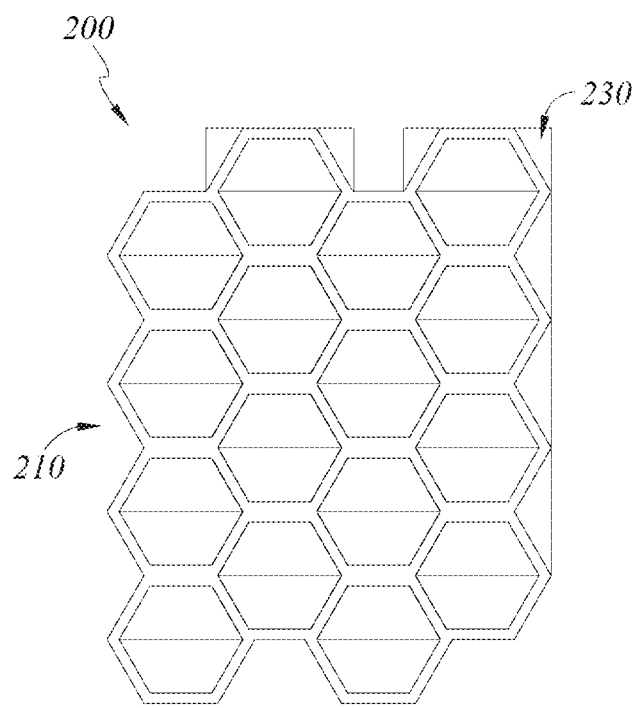
FIG. 6 shows a top view of the array of FIG. 5.
Figure 7:
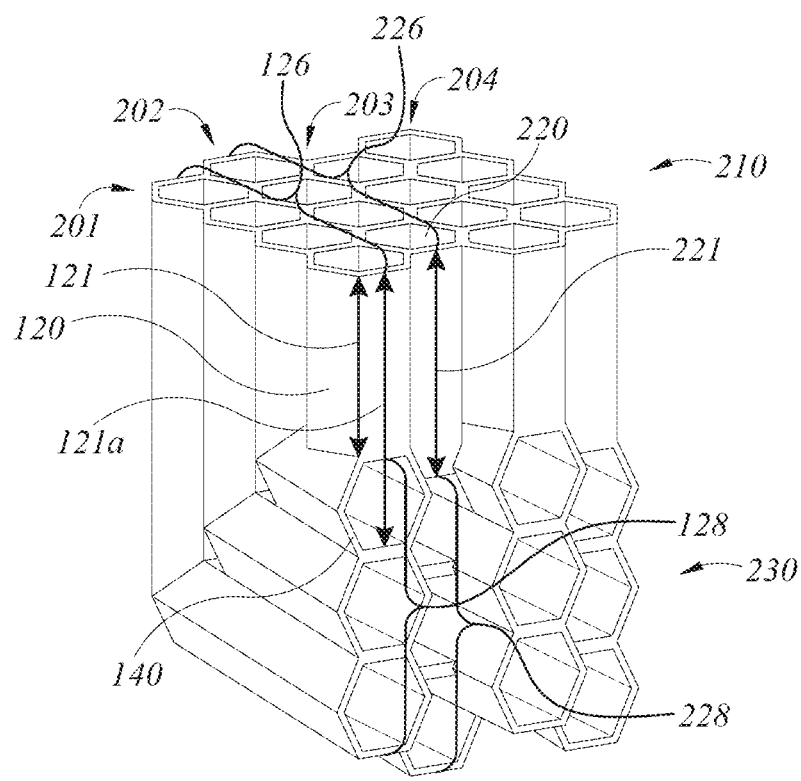
FIG. 7 shows a front perspective view of the array of FIG. 5.

FIGS. 5-7 illustrate a multi-frequency array 200. The array 200 can include multiple modules of resonator chambers, such as modules 201, 202, 203, and 204. The modules 201-204 can each be an instance of the module 100 or a modification thereof. The modules 201-204 can be assembled or formed together into the array 200. In some embodiments, the modules 201-204 are substantially identical. In certain variants, the modules 201-204 are non-identical modules. The modules, or sets of modules, can be arranged in a repeating pattern in the array 200. In certain implementations, the array 200 is manufactured as a unitary piece. The array 200 can be manufactured by injection molding, additive manufacturing, or other manufacturing method.

The modules of the array 200 can fit together in a compact arrangement. As illustrated in FIGS. 5-7, the modules 201-204 can be stacked together. The modules 201-204 can be offset by one half diameter of a resonator chamber. The modules 201-204 can be horizontally and/or vertically aligned (e.g., substantially flush or collinear). In various embodiments, the modules 201-204 can be nested and/or can share common sidewalls with adjacent modules.

The array 200 can include a leading edge 210 and a trailing edge 230. The leading edge 210 can be formed by leading edges of each of the modules 201-204. The leading edges of each of the modules 201-204 can be aligned (e.g., substantially flush with adjacent leading or trailing edges of adjacent modules) or staggered (e.g., offset with adjacent leading or trailing edges of adjacent modules). The trailing edge 230 can be formed by trailing edges of each of the modules 201-204. The trailing edges of each of the modules 201-204 can be aligned or staggered. FIG. 5 shows that the leading edge 210 includes aligned modules 201-204 and the trailing edge 230 includes staggered modules 201-204.

In certain embodiments, the array 200 can include two or more different types of modules. The modules 201, 203 can be a first type. The modules 202, 204 can be a second type. The first and second types of modules can be sized differently. The first and second types of modules can provide the generally aligned and/or staggered leading and trailing edges 210, 230.

The module 201 can include a first resonator chamber 120 and a second resonator chamber 140. The first and second resonator chambers 120, 140 can be similar to the resonator chambers 20, 40, respectively. As shown in FIG. 7, the module 201 can include upper legs 126 of the resonator chambers 20, 40 thereof. The module 202 can include upper legs 226 of the resonator chambers 20, 40 thereof. The module 201 can include lower legs 128 of the resonator chambers 20, 40 thereof. The module 202 can include lower legs 228 of the resonator chambers thereof. Lengths of the upper legs 126 and/or upper legs 226 can be adjusted to align or stagger the leading edge 210. Lengths of the lower legs 128 and/or lower legs 228 can be adjusted to align or stagger the trailing edge 230.

In some embodiments, the length 221 of a resonator chamber 220 (second type) is longer than the length 121 of resonator chamber 120 (first type). In some embodiments, the leading and trailing edges 210, 230 can be generally aligned. Having at least two different module types can provide benefits, such as the different module types each being tuned to dampen different sound frequencies, thus adding to the overall dampening effect of the array 200.

As shown in FIG. 7, in some embodiments, the trailing edge 230 of the array can include a staggered configuration. For example, the trailing edge 230 can include gaps between non-adjacent modules. Additional modules could be positioned in the gaps to expand the array 200. Alternatively, the trailing edge 230 can be aligned across the modules 201-204.

In some embodiments, the length 121 of the resonator chamber 120 can be extended by an aperture (not shown) located in the sidewall into a resonator chamber 140. In certain implementations, a length 121a is longer than the length 121 by the diameter of the resonator chamber 140. This can be used to attenuate lower frequencies than with the resonator chamber 120 alone at length 121.

Manufacturing

Figure 8:
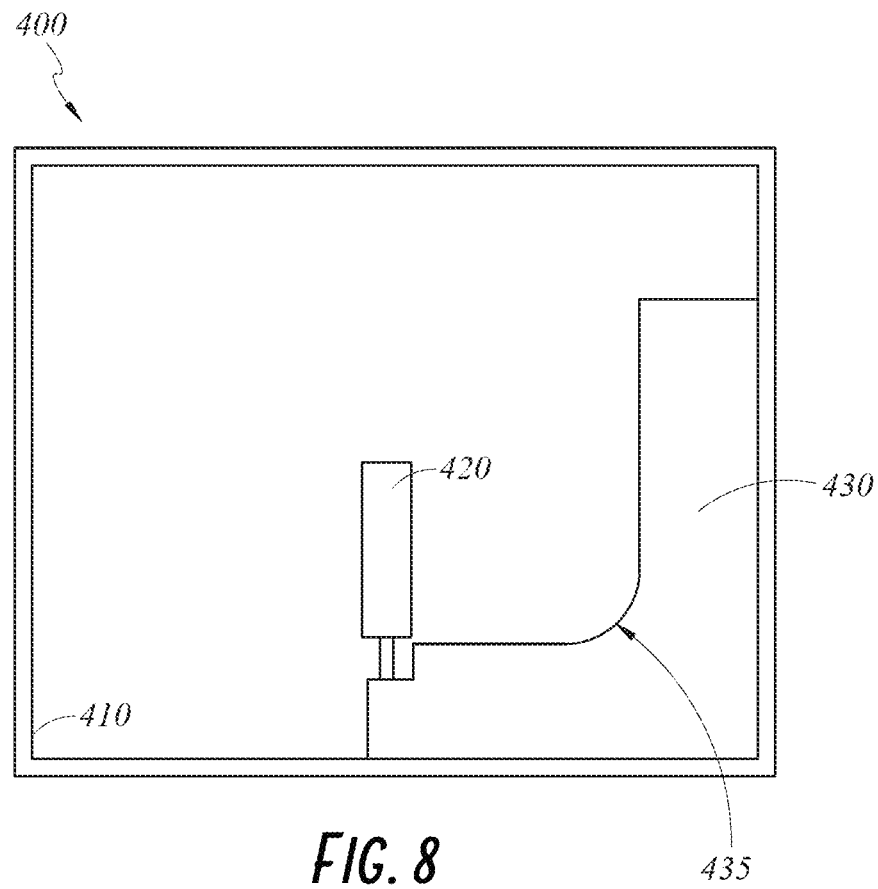
FIG. 8 shows a schematic diagram of an additive manufacturing process of a multi-frequency sound attenuator array.

The array 10, module 100, and/or array 200 described above can be built from rigid or elastomeric plastic, composites or metals. The array 10, module 100, and/or array 200 can be assembled as individual resonator chambers, mass manufactured in sheets, or other manufacturing process. As illustrated in FIG. 8, an additive manufacturing system 400 can be used to manufacture an array 430. Structurally the array 430 can be similar to the array 10, module 100, and/or array 200. In various embodiments, the manufacturing system 400 forms the array 430 by an additive manufacturing process. Additive manufacturing processes include, but are not limited to, vat photopolymerization, material jetting, binder jetting, powder bed fusion, material extrusion, directed energy deposition, and/or sheet lamination. In some embodiments, the system 400 includes fusion additive manufactured metals, which can be beneficial for use in certain higher temperature applications. The additive manufacturing process can be performed without the use of secondary forming, shaping, or bonding processes required with a single-height honeycomb sheet, such as is shown in FIG. 1.

Additive manufacturing can facilitate forming the array 430 to match curves, corners or closed shapes. The manufacturing system 400 can manufacture the array 430 in specific shapes. These specific shapes can correspond to the geometry of the desired assembly location. In some implementations, the system 400 can be used to form the multi-frequency array in three dimensions (e.g., distributing material in successive cross-sectional laminae) to form the array 430 directly onto an interior surface of an inlet duct 410. For example, an additive dispensing head 420 (e.g., a printing head) can be inserted into the inlet duct 410 and/or positioned at or near the interior surface. An additive manufacturing process can be performed directly or indirectly onto the surface of the inlet duct to form the array 430, as illustrated in FIG. 9. In some implementations, the array 430 can be printed on one, two, three, or four sides of the inlet duct 410. The interior surface can include a coating or other surface preparation, mounting structures, mechanical couplings or for securing the array 430 therewith. Some embodiments include obtaining the inlet duct 410 and/or authorization to perform the additive manufacturing process on the inlet duct 410.

In some embodiments, additively manufacturing the array 430 is performed before the inlet duct 410 is assembled with the APU and/or is installed in the aircraft. In some embodiments, additively manufacturing the array 430 is performed after the inlet duct 410 is assembled with the APU and/or is installed in the aircraft. Thus, the system 400 can be used to retrofit existing APU inlet ducts and/or aircraft. In certain embodiments, the method is performed while the inlet duct 410 is positioned in an aircraft, such as in the tail section. The system 400 can be used to conform existing structure to exhibit gradual curves and/or can reduce or eliminate sharp steps or elevation changes that could negatively impact airflow rates in the air inlet duct. In some embodiments, the system 400 can include a curved array, such as a curved corner 435 shown in FIG. 8. The curved corner 435 (rather than a sharp corner) can reduce turbulence and/or drag in the inlet duct and/or can increase the space available for resonator chambers.

Additional Examples of Resonator Systems

Figure 9A:
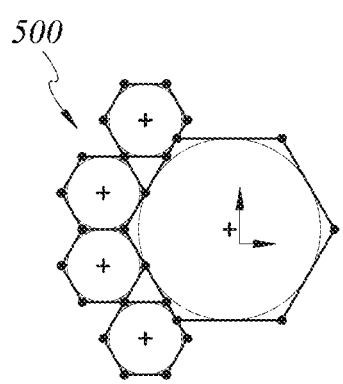
FIGS. 9A and 9B show top views of individual resonator chambers of an array having different cross-sectional shapes.
Figure 9B:
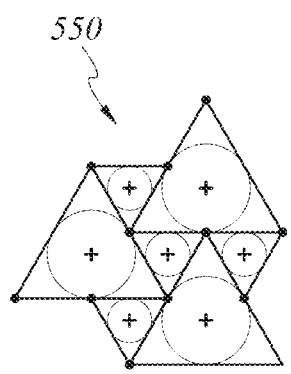

FIGS. 9A and 9B illustrate top views of portions of two additional embodiments of resonator modules 500, 550 that comprise multiple resonator chambers. The modules 500 or 550 can be used in any of the arrays 10, modules 100, array 200, and/or array 430 described above. The resonator chambers of the modules 500, 550 can include a first leg and/or second leg connected by a bend region, similar to arrays previously described. The module 500 can include a plurality of resonator chambers having a first type (e.g., a generally hexagonal cross-sectional shape) and a plurality of resonator chambers having a second type (e.g., generally triangular cross-sectional shape). The system 500 can include various sizes (e.g., lengths, diameters, or otherwise) of the first and/or second types. For example, the system 500 can include generally hexagonal resonator chambers with internal areas. The first and second types can have different sizes, such as different lengths, diameters, or otherwise. In the embodiment shown, the second type of resonator chamber can substantially fill gaps between adjacent resonator chambers of the first type.

The system 550 can have a plurality of resonator chambers of all of the same shape, such as generally triangular. The resonator chambers can have different cross-sectional sizes. As shown, resonator chambers with a smaller size can substantially fill gaps between adjacent resonator chambers of a larger size.

FIG. 10 illustrates an array 600. Each of the resonator chambers in the array 600 can have the same cross-sectional shape (e.g., generally hexagonal). The lengths of the resonator chambers can vary along a direction 602. In other implementations, the variance can be along two dimensions. A first end 604 of the array 600 can include resonator chambers having longer lengths than a second end 605 of the array 600. The lengths of the resonator chambers between the first and second ends 604, 605 can gradually or abruptly shorten along the direction 602.

Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Summary

Several illustrative embodiments of multi-frequency Helmholtz resonator systems, components thereof, and related methods have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and other implementations of the disclosed features are within the scope of this disclosure.

Some embodiments have been described in connection with the accompanying drawings. Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in other implementations. Also, the separation of various components in the implementations described above should not be understood as requiring such separation in all implementations, and it should be understood that the described components and systems can generally be integrated together in a single product or packaged into multiple products. Additionally, other implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Any of the seal features, structures, steps, or processes disclosed in this specification can be included in any embodiment. For example, illustrated polygonal shroud perimeter may be used in combination with a round opening, an oval-shaped opening, and/or any other shaped opening.

Some embodiments have been described in connection with the accompanying figures. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

For purposes of summarizing the disclosure, certain aspects, advantages and features of the inventions have been described herein. It is to be understood that not necessarily any or all such advantages are achieved in accordance with any particular embodiment of the inventions disclosed herein. No aspects of this disclosure are essential or indispensable. In many embodiments, the seal may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible.

In summary, various embodiments and examples of multi-frequency Helmholtz resonator systems, components thereof, and related methods, have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

The following is claimed:

1. An inlet duct for an aircraft, comprising:
   an interior surface of at least one side of the inlet duct;
   a plurality of resonator chambers coupled with the interior surface and configured to dampen sound, the plurality of resonator chambers comprising:
      a first chamber comprising a first longitudinal portion and a second longitudinal portion, the first longitudinal portion and the second longitudinal portion defining a first interior space, the first and second longitudinal portions coupled by a first bend region; and
      a second chamber comprising a third longitudinal portion and a fourth longitudinal portion, the third longitudinal portion and the fourth longitudinal portion defining a second interior space, the third and fourth longitudinal portions coupled by a second bend region;
   wherein the first longitudinal portion is parallel to and shorter than the third longitudinal portion, the second longitudinal portion is parallel to and shorter than the fourth longitudinal portion;
   wherein the first chamber is nested within the second chamber,
   wherein the first interior space has a first volume and the second interior space has a second volume different than the first volume.

2. The inlet duct of claim 1, wherein a length of the first longitudinal portion is different than a length of the second longitudinal portion and a length of the third longitudinal portion is different than a length of the fourth longitudinal portion.

3. The inlet duct of claim 1, wherein the first longitudinal portion is half as long as the second longitudinal portion.

4. The inlet duct of claim 1, wherein the first and second longitudinal portions of the first chamber are at an angle of approximately 90 degrees.

5. The inlet duct of claim 1, wherein a first end of the first chamber is substantially flush with a second end of the second chamber.

6. The inlet duct of claim 5, wherein a third end of first chamber is substantially flush with a fourth end of the second chamber.

7. The inlet duct of claim 1, wherein the first chamber is nested within the second bend region of the second chamber.

8. The inlet duct of claim 7, wherein the plurality of resonator chambers further comprises a third chamber having a third bend region, the second chamber nested in the third bend region of the third chamber.

9. The inlet duct of claim 1, wherein the first chamber has a first diameter and the second chamber has a second diameter, the first and second diameters being different.

10. The inlet duct of claim 1, wherein the first chamber has a first cross-sectional shape and the second chamber has a second cross-sectional shape.

11. The inlet duct of claim 10, wherein the first cross-sectional shape is different than the second cross-sectional shape.

12. The inlet duct of claim 1 wherein the first and second chamber are part of an array of resonator chamber modules.

13. A resonator array comprising:
   a plurality of resonator chambers comprising:
      a first chamber including a first longitudinal portion and a second longitudinal portion, the first longitudinal portion and the second longitudinal portion defining a first interior space, the first and second longitudinal portions coupled by a first bend region; and
      a second chamber comprising a third longitudinal portion and a fourth longitudinal portion, the third longitudinal portion and the fourth longitudinal portion defining a second interior space;
   wherein the first chamber is nested within the second chamber; and
   wherein the first interior space has a first volume and the second interior space has a second volume different than the second volume.

14. The resonator array of claim 13, wherein an overall length of the first chamber is shorter than an overall length of the second chamber.

15. The resonator array of claim 13, wherein the first chamber has a first diameter and the second chamber has a second diameter, the first and second diameters being different.

16. The resonator array of claim 13, wherein the first chamber has a first cross-sectional shape and the second chamber has a second cross-sectional shape.

17. The resonator array of claim 16, wherein the first cross-sectional shape is different than the second cross-sectional shape.

18. The resonator array of claim 13, wherein the first and second chambers are tuned to dampen different frequencies of sound.

19. A method of manufacturing a sound dampening inlet duct for an aircraft, the method comprising:
  inserting a material dispensing head into an inlet duct;
  adding material, with the material dispensing head, onto an interior wall of the inlet duct; and
  forming, with the added material, an integrated multi-frequency array of interconnected resonator chambers on the interior wall of the inlet duct;
  wherein the integrated multi-frequency array of interconnected resonator chambers comprises a plurality of first chambers having a first volume and a plurality of second chambers having a second volume;
  each first chamber comprising a first longitudinal portion and a second longitudinal portion, the first longitudinal portion and the second longitudinal portion defining a first interior space, the first and second longitudinal portions coupled by a first bend region; and
  each second chamber comprising a third longitudinal portion and a fourth longitudinal portion, the third longitudinal portion and the fourth longitudinal portion defining a second interior space, the third and fourth longitudinal portions coupled by a second bend region; and
  wherein the first longitudinal portion is parallel to and shorter than the third longitudinal portion, the second longitudinal portion is parallel to shorter than the fourth longitudinal portion, and each first resonator chamber is nested within a second resonator chamber.

20. The method of claim 19, wherein the inlet duct is positioned in an aircraft.

* * * * *